June 9, 1959 C. H. WHITLOCK 2,890,080
HOPPER LOADERS FOR FINELY GROUND MATERIALS
Filed Sept. 30, 1957 2 Sheets-Sheet 2
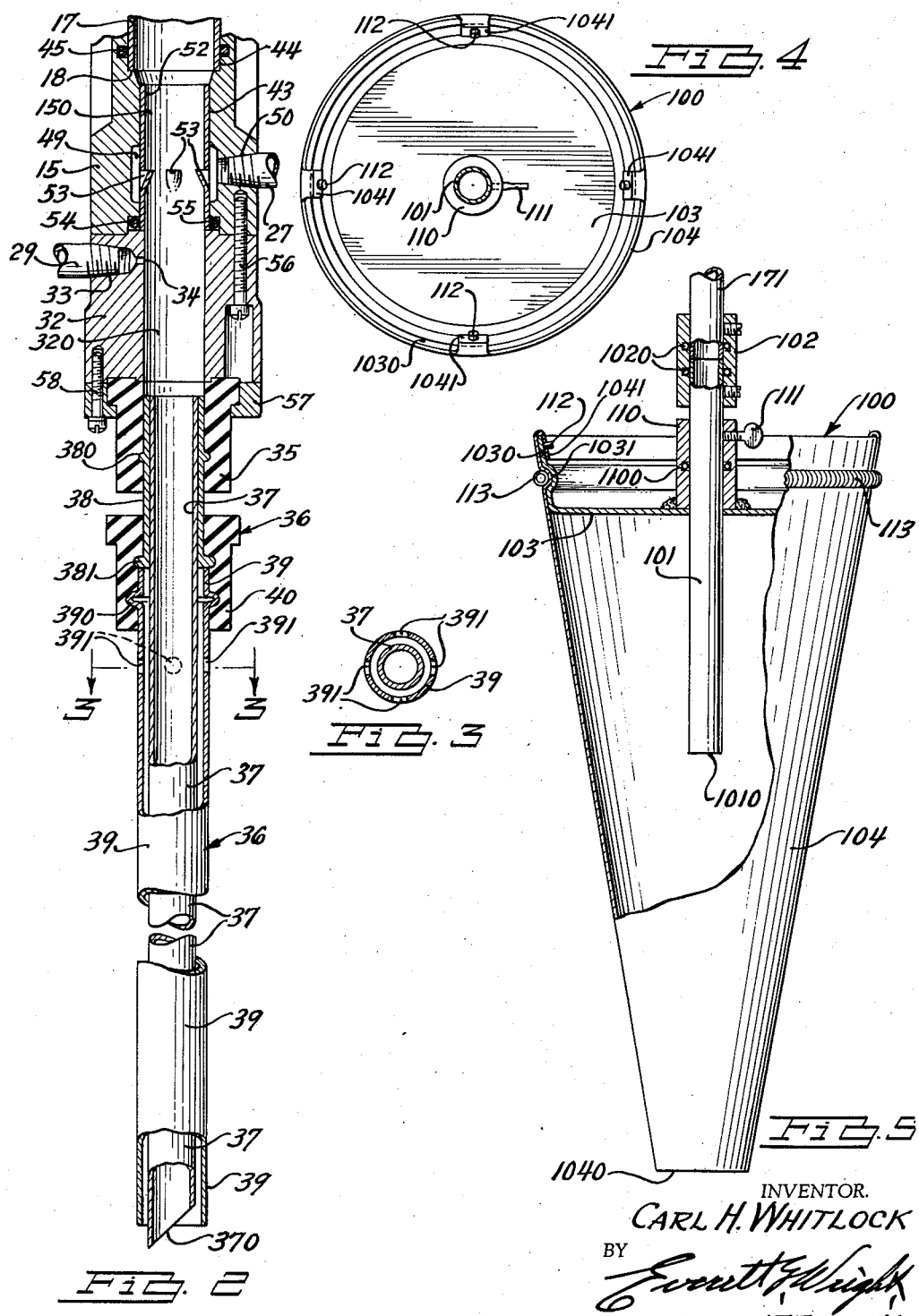
INVENTOR.
CARL H. WHITLOCK
BY
ATTORNEY United States Patent Office 2,890,080
Patented June 9, 1959

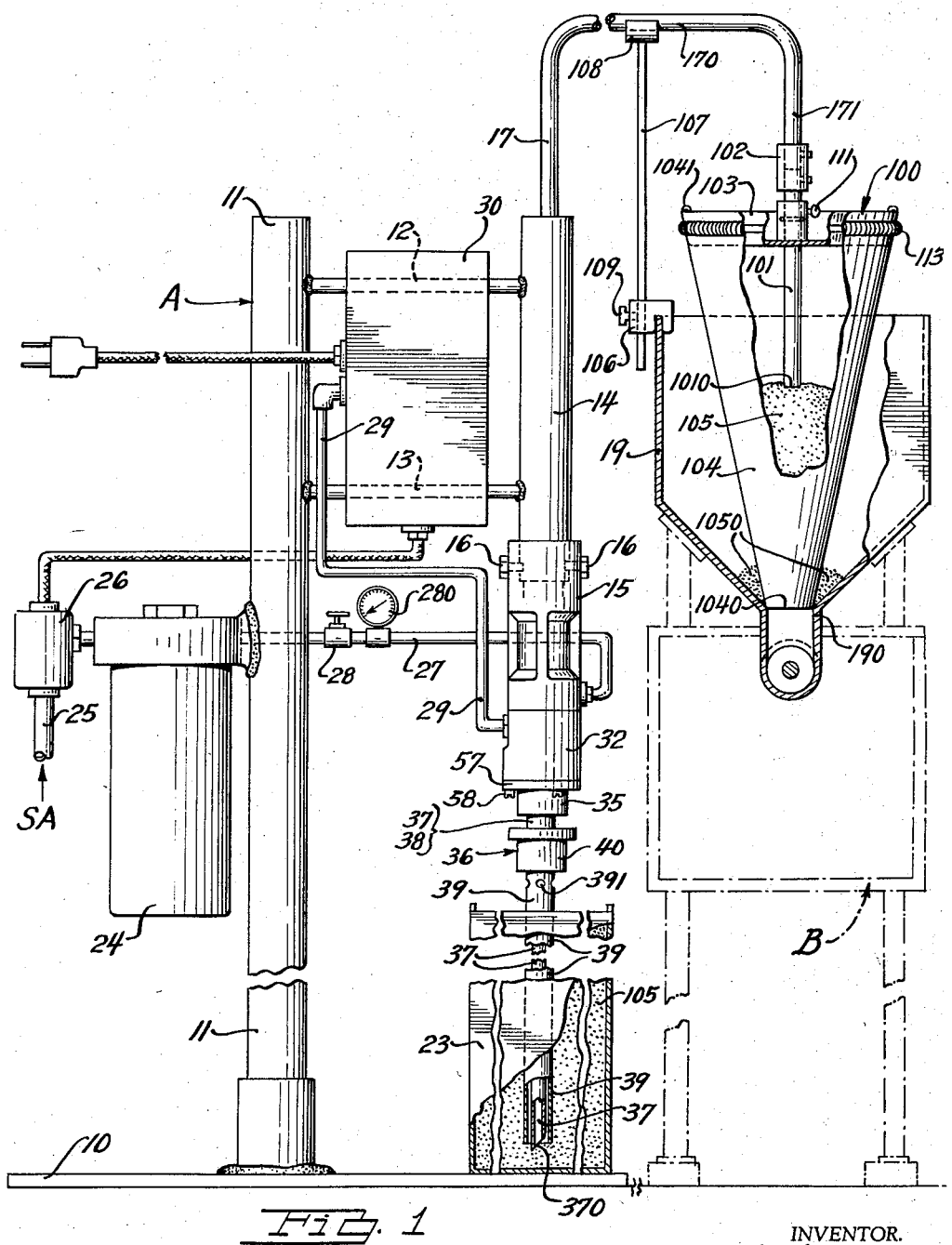

---

2,890,080

HOPPER LOADERS FOR FINELY GROUND MATERIALS

Carl H. Whitlock, Avon Township, Oakland County, Mich., assignor to Whitlock Associates, Inc., a corporation of Michigan Application September 30, 1957, Serial No. 687,166

4 Claims. (Cl. 302—59)

This invention relates to hopper loaders of the type that elevates and transports finely ground materials or coarse materials including a substantial percentage of fines from a drum or other container to the hopper of a molding machine or the like.

This invention is an improvement over the hopper loader mechanism disclosed and claimed in U.S. Letters Patent No. 2,774,636, entitled Hopper Loaders, issued to Carl H. Whitlock on December 18, 1956, and is not only applicable to such hopper loaders, but is usable with other hopper loaders wherein finely ground or coarse materials including a substantial percentage of fines are transported in an air stream to the hopper of a molding machine or the like from which the said materials are removed by gravity or other feed means.

The primary object of this invention is to provide an improvement in hopper loaders of the type that transports finely ground material or a coarse material including a substantial percentage of fines in an air stream from a container such as a drum or bag to a hopper wherein the deposit of the finely ground material into the hopper is substantially without dusting, and wherein the suction tube disposed in the container and extending substantially to the bottom thereof will function properly even though it is embedded to a considerable depth in the material in said container.

A further object of the invention is to provide an improved hopper loader construction of the type disclosed wherein the filter hopper element employed is easily installed and readily changed as may be required from time to time.

Other objects of the invention will become apparent by reference to the following detailed description taken in connection with the accompanying drawings wherein:

Fig. 1 is a more or less diagrammatic elevational view showing a hopper loader embodying the invention, portions being broken away to clearly show the improved construction.

Fig. 2 is a vertical sectional view of the improved suction tube mechanism.

Fig. 3 is a cross sectional view taken on the line 3—3 of Fig. 2.

Fig. 4 is a top plan view of the auxiliary filter hopper preferably employed.

Fig. 5 is a side elevational view of the auxiliary filter hopper with portions broken away to better show the preferred construction thereof.

Referring now to the drawings wherein like reference numerals refer to like and corresponding parts throughout the several views, the particular embodiment of the invention disclosed for illustrative purposes consists of a hopper loader mechanism A of the type disclosed in the applicant's U.S. Patent No. 2,774,636 with certain modifications as hereinafter set forth including a conveyor tube 17 leading from the said hopper loader mechanism A to a depending position above the center of a hopper 19, which may be the hopper of a plastic molding machine B or the like. An auxiliary filter hopper generally designated by the numeral 100 is mounted on the depending end 171 of the said conveyor tube 17 and consists generally of a vertically disposed discharge tube 101 coupled on the said depending end 171 of the conveyor tube 17 by a suitable sleeve coupling 102 having O-ring seals 1020 therein, a circular filter hopper head 103 telescopingly mounted for vertical adjustment on the said discharge tube 100, and an open bottom inverted frusto-conical filter hopper element 104 removably connected to and disposed in depending relationship from the said filter hopper head 103. The said discharge tube 101 extends a suitable distance into the said hopper 19 and into the said filter hopper element 104 to establish the depth to which the said filter hopper element 104 is filled with finely ground material 105 which also may be a relatively coarse material containing a substantial percentage of fines. The open bottom 1040 of the said filter hopper element 104 is located in juxtaposition to the top of the discharge throat or bottom outlet 190 of the hopper 19. The joint between the bottom 1040 of the filter hopper element 104 and the discharge throat 190 of the hopper 19 is sealed by a build-up of finely ground material 105 at 1050 when the said finely ground material 105 first enters the said filter hopper element 104 through the discharge tube 100.

The hopper loader mechanism A shown in Fig. 1 preferably has a base 10 onto which is mounted an upright stanchion 11 from which the entire hopper loader mechanism is supported. Near the top of the stanchion 11 two vertically spaced laterally disposed cantilever arms 12 and 13 support a sleeve 14 which has a venturi 15 secured in telescopic depending relationship therefrom by such means as suitable studs 16. The venturi 15 supports a discharge or conveyor tube 17 which extends upwardly from a shoulder 18 therein through the said sleeve 14. The said discharge tube 17 has an upper horizontal portion 170 and a depending outer end portion 171 leading respectively laterally over and downwardly into a hopper 19. A bracket 106 may be hung onto the upper edge of the hopper 19 to carry an adjustable strut 107 having a yoke 108 at the top thereof. The said strut 107 and yoke 108 support the upper horizontal portion 170 of the conveyor tube 17, and the strut 107 is held in its adjusted position by a suitable stud 109 extending through the said bracket 106.

The filter hopper head 103 is preferably circular and pan shaped as best shown in Figs. 4 and 5 and is centrally apertured and provided with a central upstanding sleeve 110 welded thereto which telescopes onto the said vertically disposed discharge tube 101 connected to the depending end 171 of the conveyor tube 17 by a sleeve coupling 102 as hereinbefore described. The said sleeve 110 of the filter hopper head 103 is preferably provided with an inner annular groove to accommodate an O-ring seal 1100 to prevent leakage of air and finely ground material between the filter hopper head 103 and the said discharge tube 101. A wing stud 111 extends horizontally through the upstanding sleeve 110 of the filter hopper head 103 to fix it at a suitable position along the discharge tube 101 so that the lower open bottom 1040 of a filter hopper element 104 hung onto the filter hopper head 103 may be disposed in juxtaposition to the said throat or bottom outlet 190 of the hopper 19. A plurality of anchor pins 112 are fixed to and extend radially inwardly from the annular wall 1030 of the filter hopper head 103 to accommodate complementarily punctured tabs 1041 formed at the upper periphery of the said inverted frusto-conical filter hopper element 104. The outer periphery of the said outer annular wall 1030 of the filter hopper head 103 is provided with a circumferential groove 1031 therein to accommodate an annular garter type spring 113 which fixes and holds the upper peripheral portion of the said filter hopper element 104 in sealed relationship to the said filter hopper head 103.

The said inverted frusto-conical filter hopper element 104 is formed of any suitable filter material such as paper which will retain the finely ground material 105, or a coarse material including a substantial percentage of fines, and yet permit the air of the air stream employed to convey the said finely ground material 105 to the filter hopper element 104 of the auxiliary filter hopper 100 to pass through the wall of the said filter hopper element 104 after the open bottom 1040 thereof becomes sealed by a build-up 1050 of the said finely ground material 105 around the juncture of the said open bottom 1040 of the filter hopper element 104 and the inside of the hopper 19 just above the discharge throat 190 thereof, see Fig. 1. Finely ground material 105 may be removed from the filter hopper element 104 through the hopper discharge throat 190 by such suitable means as a screw conveyor 191 or the like. The finely ground material 105 builds up in the filter hopper element 104 to just above the lower end 1010 of the discharge tube 101 as indicated in Fig. 1 whereupon the finely ground material 105 seals the said lower end 1010 of the discharge tube 101 and causes the hopper loader A to cease to function until sufficient material has been used from the filter hopper element 104 to free the said lower end 1010 of the discharge tube 101 and permit the said hopper loader A to operate and replace the finely ground material 105 withdrawn therefrom.

Referring now to the hopper loader A, on the stanchion 11 is mounted an air filter 24 which is connected to a source of compressed air SA supplied through the compressed air supply line 25. A spring closed electrically opened solenoid valve 26 interposed in the compressed air supply line 25 provides compressed air to the hopper loader venturi 15 when called for by the vacuum-electrically operated control mechanism housed in the control box 30 such as described in Patent No. 2,774,636. The compressed air which passes through the solenoid valve 26 and the air filter 24 is supplied at suitable intervals through a compressed air line 27 to the venturi 15. A needle valve 28 is inserted in the compressed air line 27 for the purpose of regulating the amount of compressed air supplied to the venturi 15 when the hopper loader is functioning. An air gage 280 is interposed in the compressed air line 27 between the needle valve 28 and the venturi 15 to permit visual checking of the operating back pressure when the hopper loader is functioning. A vacuum line 29 runs from a point below the venturi 15 to a vacuum controlled switch mechanism located within the control box 30 which is mounted on the cantilever arms 12 and 13. The said vacuum controlled switch mechanism of the hopper loader A permits the said hopper loader to function only when the finely ground material 105 in the auxiliary filter hopper 100 is at a level below the bottom 1010 of the discharge tube 101 thereof.

A collar 32 is mounted by suitable studs 56 in depending relationship from the venturi 15. To the bottom of the collar 32 is connected a suction tube assembly 36 by means of a friction connector 35 fixed to the bottom of the said collar 32 by a securing ring 57 and studs 58. With this friction type connector 35, the suction tube assembly 36 may be readily connected to and removed from the said collar 32 to permit rapid change-over from an empty to a full drum or container 23.

The venturi 15 is bored at its lower end at 43, and is counterbored at its upper end at 44 to accommodate the lower end of the discharge tube 17 which rests on a shoulder 18 formed at the lower end of the said counterbore 44. An O-ring seal 45 is provided between the venturi counterbore 44 and the discharge tube 17. The said bore 43 at the lower end of the venturi 15 is provided with an annular internal groove at 49, and is radially bored and threaded at 50 to accommodate the compressed air line 27 which communicates with the air distribution chamber 51 formed by a venturi liner 52 which is telescopingly positioned over the said internal groove 49 within the venturi 15. The venturi liner 52 has a plurality of upwardly discharging venturi jets 53 formed therein preferably as shown in Fig. 2. The bottom of the venturi 15 is counterbored at 54 to form in cooperation with the lower end of the venturi liner 52 an annular groove which accommodates an O-ring 55 to provide an air seal between the lower end of the venturi 15 and the collar 32 depending therefrom when the said collar 32 is firmly secured to the said venturi by the studs 56. The upper wall of the collar 32 is radially bored and counterbored at 33 and 34 respectively. The bore 33 is suitably threaded to receive the vacuum line 29, and the counterbore 34 serves as a suction passage between the vacuum line 29 and the central passage 320 of the collar 32 which is aligned with the main venturi passage 150.

The suction tube assembly 36 consists of a suction tube 37 having a collar 38 pressed onto the upper end thereof, the said collar 38 preferably having an upper circumferential rib 380 near the upper end thereof and a lower circumferential rib 381 near the bottom thereof. The suction tube 37 is disposed in spaced relationship within an air bleeder tube 39. The upper outer end of the said bleeder tube 39 is ribbed circumferentially at 390 and telescoped within a connector sleeve 40 which in turn is telescoped over the lower end and circumferential rib 381 of the collar 38. The upper end of the said air bleeder tube 39 is preferably positioned against the lower end of the said connector sleeve 40. The circumferential rib 380 near the upper end of the collar 38 is somewhat smaller than the circumferential rib 381 at the lower end thereof and the outer circumferential rib 390 at the upper end of the connector sleeve 40 so that, when removing the suction tube assembly 36 from the friction connector 35 fixed to the bottom of the venturi collar 32 by the securing ring 57 and studs 58, the suction tube assembly 36 consisting of the suction tube 37, its collar 38 and the air bleeder tube 39 connected together by the connector sleeve 40 will not become accidentally disassembled. The said air bleeder tube 39 is provided with a plurality of relatively small apertures 391 therethrough just below the said connector sleeve 40 to admit ambient air into the air passage provided between the said suction tube 37 and the outer air bleeder tube 39.

The lower end 370 of the suction tube 37 is preferably cut to a bevel such as shown in Fig. 2 and is sufficiently long in respect to the outer air bleeder tube 39 so that a portion of the suction tube 37 extends below the said air bleeder tube 39. With the foregoing construction, ambient air is bled through the air bleeder tube 39 into the bottom of the drum or container 23 alongside the lower end 370 of the suction tube 37 to prevent the finely ground material 105 in the drum or container 23 from sealing the lower end 370 of the said suction tube 37 whereby to cause failure in the operation of the hopper loader A.

When in use, the hopper loader mechanism A is placed alongside the hopper 19 of a plastic machine B or the like, and the depending end 171 of the conveyor tube 17 is positioned centrally over the discharge throat or bottom outlet 190 of the said hopper 19. A drum 23 of finely ground material 105, or a coarse material containing a substantial percentage of fines, is placed directly under the friction connector 35 of the collar 32 of the venturi 15 of the said hopper loader mechanism A. The suction tube assembly 36 is placed into the finely ground material 105 in the drum 23, and is connected to the said friction connector 35 in the manner hereinbefore described and as shown in Figs. 1 and 2.

The auxiliary filter hopper 100 is then connected in depending relationship onto the depending end 171 of the conveyor tube 17 by first connecting the discharge tube 101 thereto by means of the sleeve coupling 102 and then telescoping the filter hopper head 103 onto the said discharge tube 101. A filter hopper element 104 is then assembled onto the filter hopper head 103 as hereinbefore described, and the filter hopper head 103 is adjusted vertically along the discharge tube 101 until the lower periphery of the open bottom 1040 of the filter hopper element 104 is disposed in juxtaposition to the throat or bottom outlet 190 of the hopper 19 of the plastic machine B or the like.

The hopper loader mechanism A is then actuated to provide a flow of compressed air through the venturi 15 thereof which creates a vacuum in the suction tube 37 of the suction tube assembly 36 whereby to lift finely ground material 105 from the drum or container 23 to the venturi 15 from whence it is transported in the air stream through the conveyor tube 17 and discharge tube 101 into the auxiliary filter hopper 100. At first the air of the said conveyor air stream escapes between the periphery of the open bottom 1040 of the filter hopper element 104 until sufficient finely ground material is deposited at 1050 to provide an air seal between the periphery of the open bottom 1040 of the filter hopper element 104 and the hopper 19. The air of the conveyor air stream now escapes from the auxiliary filter hopper 100 through the filter hopper element 104 above the level of finely ground material 105 that is deposited therein. Some dusting occurs until the air seal 1050 is built up, but thereafter the hopper loader operation is substantially dustless. When the auxiliary filter hopper 100 is filled with finely ground material to just above the lower end of the discharge tube 101, the hopper loader mechanism A automatically shuts off, and starts again automatically only after sufficient finely ground material 105 is withdrawn from the filter hopper 100 to cause the level of finely ground material to drop below the lower end of the discharge tube 101.

When withdrawing finely ground material 105 from the drum or container 23, air is supplied at the intake end 370 of the suction tube 37 of the suction tube assembly 36 through the air bleeder tube 39 therearound, ambient air being bled into the air bleeder tube 39 through the apertures 391 therein located near the top thereof. Without such a bleeder provision, the finely ground material 105 is apt to clog the lower intake end 370 of the said suction tube 37, particularly when a considerable depth of finely ground material 105 lies in the drum or other container 23 above the said lower intake end 370 of the suction tube 37.

Although but a single embodiment of the invention has been disclosed and described in detail, it is obvious that many changes may be made in the size, shape, arrangement and detail of the various elements of the invention without departing from the spirit and scope thereof as defined by the appended claims.

I claim:

1. In a separator for finely ground materials carried in an air stream through a conveyor tube thereto, a hopper having an open top and an air restricted bottom discharge throat, a discharge tube extending downwardly from said conveyor tube into said hopper, an auxiliary filter hopper having a lower open end connected at its upper end in sealed relationship to said discharge tube, said lower open end of said auxiliary filter hopper depending into said hopper with its lower end disposed in juxtaposition to the discharge throat thereof.

2. In a separator for finely ground materials carried in an air stream through a conveyor tube thereto, a hopper having an open top and an air restricted discharge throat, a discharge tube extending downwardly from said conveyor tube into said hopper, an auxiliary filter hopper comprising a head element telescoped in sealed relationship onto said depending discharge tube and an inverted frusto-conical filter element having an open lower end connected at its upper end in sealed relationship to said head element, said frusto-conical filter element depending into said hopper with its lower end disposed in juxtaposition to the discharge throat thereof.

3. In a separator for finely ground materials carried in an air stream through a conveyor tube thereto, a hopper having an open top and an air restricted discharge throat, a discharge tube extending downwardly from said conveyor tube into said hopper, an auxiliary filter hopper comprising a circular head including a central sleeve telescoped in sealed relationship onto said depending discharge tube, and an inverted frusto-conical filter element having an open lower end connected at its upper end in sealed relationship to said circular head, the lower end of said filter element being disposed in said hopper in substantial contact with the discharge throat thereof.

4. In a separator for finely ground materials carried in an air stream thereto, a hopper having an open top and an air restricted discharge throat, a discharge tube extending downwardly from said conveyor tube into said hopper, an auxiliary filter hopper comprising a circumferentially grooved dish shaped head telescoped in sealed relationship onto said depending discharge tube, a plurality of circumferentially spaced radially inwardly disposed filter suspension pins on the wall of said dish shaped filter hopper head, an inverted frusto-conical filter element having open upper and lower ends and apertured tabs extending from the upper periphery thereof engaged on said filter element suspension pins, a garter type spring hermetically sealing the top of said filter element to said circular dish shaped filter hopper head at said circumferential groove therein, and means for fixing the said circular dish shaped filter hopper head at a selected location along said discharge tube wherein the lower open end of said filter element is disposed in juxtaposition to the discharge throat of said hopper.

References Cited in the file of this patent
UNITED STATES PATENTS

| | | |
|---|---|---|
| 1,416,013 | Gieseler | May 16, 1922 |
| 2,717,124 | Fielden | Sept. 6, 1955 |
| 2,774,636 | Whitlock | Dec. 18, 1956 |